UNITED STATES PATENT OFFICE 1,988,991

MANUFACTURE OF SOLID PRODUCTS CONTAINING ALKALI HYPOCHLORITE

Franz Albertshauser, Muttenz-Baselland, Switzerland, assignor to the firm Henkel & Cie. Gesellschaft mit beschrankter Haftung, Dusseldorf, Germany No Drawing. Application January 12, 1933, Serial No. 651,443. In Germany February 19, 1932

8 Claims. (Cl. 23—250)

The use of solid products containing alkali hypochlorite is of importance in bleaching, laundry work, and the cleansing and disinfection industries wherever the use of other solid hypochlorite compounds, such as chloride of lime, is not desirable, or where the costs of transporting hypochlorite solutions render the use of the latter uneconomical. Solid products containing hypochlorite have the advantage that they are transportable, are stable and may be conveniently measured out.

The manufacture of solid products containing alkali hypochlorite has previously been attempted in a variety of ways. The known methods of obtaining these products partly comprise introducing inorganic salts, which possess the property of binding water of crystallization, in the anhydrous or partly dehydrated state into alkali hypochlorite solutions in order thereby to obtain solid additive products with the alkali hypochlorite. For example, in one known process, entirely or partly dehydrated inorganic salts, such as sodium carbonate or sodium phosphate are introduced into strong hypochlorite solutions with 30 per cent. of active chlorine at temperatures not above 60° C., and the mixture is cooled in order to remove the heat of reaction. The said working temperature was obviously selected because, according to the literature, hypochlorite solutions tend to decompose at somewhat high temperatures.

It has now been found that stable hypochlorite-containing additive compounds with inorganic salts may be obtained in a simple manner even with the application of heat, without any loss of chlorine above the extent normally to be expected.

According to the invention, inorganic salts containing water of crystallization or mixtures of such salts are melted in their own water of crystallization in a suitable melting vessel, for example, an externally heated pot, which pot may be made of cast iron without prejudicing the stability of the products, and, either after they have been suitably evaporated or after further quantities of salt containing little or no water have been added thereto, are mixed while hot, i. e. between 90° and 125° C. with alkali hypochlorite solution. The molten mass is then allowed to crystallize by surface cooling.

As suitable salts, sodium phosphates, sodium metasilicate, or soda may be employed for example.

A particular advantage of the process according to the invention is that external or internal cooling of the reaction vessel during crystallization is unnecessary. This results in a considerable technical advantage, since external cooling often gives rise to undesirable depositions on the cooled surfaces, and also may lead to sudden solidification of the contents of the vessel due to local super-cooling. The new process therefore results in thoroughly uniform, crystalline, stable end products. In addition it is possible at the same time to adjust the chlorine content of the end product as desired.

Examples (1) 226 kilograms of $Na_3PO_4.11H_2O$ are melted in the pot at 75° C. and 57 kilograms of $Na_3PO_4.1H_2O$ are introduced into the molten mass while stirring, the temperature being raised to from 100° to 110° C. As soon as the mass has been evenly stirred, 100 kilograms of sodium hypochlorite solution with a content of 12.5% of active chlorine are run in, whereby the temperature falls to about 90° C. After thoroughly rabbling or stirring, the contents of the melting pot are allowed to run freely on to suitable cooling surfaces. For example, the molten mass may be allowed to run on to extensive stone or metal surfaces or allowed to solidify in troughs in shallow layers, or may be caused to crystallize rapidly by means of cooled rotating drums. There are obtained 387 kilograms of an end product which, according to the water content, corresponds to a trisodium phosphate containing 12 molecules of water of crystallization and and 3.20 per cent. of active chlorine (theoretical content 3.21 per cent.). After two months storage, the chlorine content was 3.11 per cent.

(2) 97.5 kilograms of $Na_3PO_4.1H_2O$ are melted with 235.7 kilograms of $Na_3PO_4.11H_2O$ at 100° to 110° C. After adding 100 kilograms of hypochlorite solution with a content of 12.5 per cent. of active chlorine, there is obtained on crystallization 333 kilograms of an additive product with 2.54 per cent. of active chlorine corresponding according to the water content to the formula $Na_3PO_4.10H_2O$. After six weeks storage, the chlorine content of the product was 2.51 per cent.

(3) 275 kilograms of $Na_3PO_4.11H_2O$ are melted with 75.7 kilograms of $Na_3PO_4.1H_2O$ at 100° to 110° C. and 100 kilograms of sodium hypochlorite solution with a content of 12.5 per cent. of active chlorine are added to the molten mass. The crystallization product obtained from the molten mass corresponds according to its water content to the formula $Na_3PO_4.11H_2O$ and contains 2.53 per cent. of active chlorine. After two months storage, the chlorine content was 2.49 per cent.

(4) 100 kilograms of $Na_3PO_4.11H_2O$ are melted together with 10 kilograms of anhydrous trisodium phosphate at about 80 to 85° C., and thereupon 30 kilograms of 20 per cent. sodium hypochlorite solution are added to the molten mass with thorough stirring. The subsequent treatment of the molten mass is effected as described in Example 1. The product contains about 4.3 per cent. of active chlorine.

(5) 100 kilograms of $Na_3PO_4.11H_2O$ are melted with 5.3 kilograms of anhydrous trisodium phosphate in the same way as in Example 4 and are mixed with 20 kilograms of 20-per cent. sodium hypochlorite solution. The product obtained in this case contains 3.2 per cent. of active chlorine.

I claim:

1. The process for the manufacture of solid, stable crystalline additive products of sodium hypochlorite and alkaline salts of alkaline reaction which are capable of combining with water of crystallization, comprising melting such an alkaline salt in its own water of crystallization, mixing the molten mass at temperatures between 90° and 125° C. with a solution of alkali hypochlorite and removing at any moment during the heating such quantity of water as to cause the mixture to solidify when cooled to normal temperature.

2. The process for the manufacture of solid, stable crystalline additive products of sodium hypochlorite and alkaline salts of alkaline reaction which are capable of combining with water of crystallization, comprising melting a mixture of such alkaline salts containing water of crystallization in their own water of crystallization, mixing the molten mass at temperatures between 90° and 125° C. with a solution of alkali hypochlorite and removing at any moment during the heating such quantity of water as to cause the mixture to solidify when cooled to normal temperature.

3. The process for the manufacture of solid, stable crystalline additive products of sodium hypochlorite and alkaline salts of alkaline reaction which are capable of combining with water of crystallization, comprising melting such an alkaline salt in its own water of crystallization, adding such quantities of the dehydrated salt that the mixture when cooled will be solid, mixing the molten mass at temperatures between 90° and 125° C. with a solution of alkali hypochlorite and cooling the mixture to cause it to solidify.

4. The process for the manufacture of a stable crystalline additive product containing sodium hypochlorite, which comprises melting sodium carbonate in its own water of crystallization, mixing the molten mass at temperatures between 90 and 125° C. with sodium hypochlorite solution, and removing at any moment during the heating such quantity of water as to cause the mixture to solidify when cooled to normal temperature.

5. The process for the manufacture of a stable crystalline additive product containing sodium hypochlorite, which comprises melting sodium metasilicate in its own water of crystallization, mixing the molten mass at temperatures between 90 and 125° C. with sodium hypochlorite solution, and removing at any moment during the heating such quantity of water as to cause the mixture to solidify when cooled to normal temperature.

6. The process for the manufacture of a stable crystalline additive product containing sodium hypochlorite, which comprises melting trisodium phosphate in its own water of crystallization, mixing the molten mass at temperatures between 90 and 125° C. with sodium hypochlorite solution, and removing at any moment during the heating such quantity of water as to cause the mixture to solidify when cooled to normal temperature.

7. The process for the manufacture of a solid stable crystalline product containing sodium hypochlorite, which comprises melting a mixture of $Na_3PO_4.11H_2O$, adding such quantity of $Na_3PO_4.H_2O$ as to absorb the greater part of the water contained in said mixture, mixing the molten mass at between 100° and 110° C. with sodium hypochlorite solution and pouring the mixture on to a cooling surface to cause it to solidfy.

8. The process for the manufacture of a stable crystalline additive product containing sodium hypochlorite, which comprises melting one of the salts of the group consisting of sodium carbonate, sodium metasilicate and trisodium phosphate in its own water of crystallization, mixing the molten mass at a temperature between 90° and 125° C. with sodium hypochlorite solution, and removing at any moment during the heating such quantity of water as to cause the mixture to solidify when cooled to normal temperature.

FRANZ ALBERTSHAUSER